United States Patent
Rinzler et al.

(10) Patent No.: US 10,885,535 B2
(45) Date of Patent: Jan. 5, 2021

(54) ONLINE SITUATIONAL AWARENESS AND VIDEO SURVEY SYSTEM

(71) Applicant: 1Q, LLC, Atlanta, GA (US)

(72) Inventors: Keith Rinzler, Sandy Springs, GA (US); Ryan Cino, Decatur, GA (US); Brian Scully, Marietta, GA (US); Ken Icklan, Atlanta, GA (US)

(73) Assignee: 1Q, LLC, Atlanta, GA (US)

( * ) Notice: Subject to any disclaimer, the term of this patent is extended or adjusted under 35 U.S.C. 154(b) by 97 days.

(21) Appl. No.: 16/028,677

(22) Filed: Jul. 6, 2018

(65) Prior Publication Data

US 2020/0013076 A1 Jan. 9, 2020

(51) Int. Cl.
- *G06Q 30/02* (2012.01)
- *H04N 21/478* (2011.01)
- *G06F 3/0484* (2013.01)

(52) U.S. Cl.
CPC ....... *G06Q 30/0203* (2013.01); *G06F 3/0484* (2013.01); *H04N 21/478* (2013.01)

(58) Field of Classification Search
CPC . G06Q 30/0203; H04N 21/478; G06F 3/0484
See application file for complete search history.

(56) References Cited

U.S. PATENT DOCUMENTS

| | | | | |
|---|---|---|---|---|
| 8,839,288 B2* | 9/2014 | Morris | ............... | H04N 21/4126 725/10 |
| 8,904,414 B2* | 12/2014 | Ku | ................... | H04N 7/17327 725/1 |
| 9,591,265 B2* | 3/2017 | Grubb | .................... | H04N 7/165 |
| 2003/0037068 A1* | 2/2003 | Thomas | .................. | H04N 5/76 |
| 2008/0306999 A1* | 12/2008 | Finger | ................. | G06F 16/4393 |
| 2015/0172745 A1* | 6/2015 | Walker | ................ | H04N 21/435 725/34 |
| 2015/0317639 A1* | 11/2015 | Ward | .................. | G06Q 30/016 705/304 |
| 2016/0359990 A1* | 12/2016 | Dabbiere | ............ | H04L 65/1083 |
| 2017/0053298 A1* | 2/2017 | Sun | .................... | G06Q 30/0203 |
| 2019/0104331 A1* | 4/2019 | Bapna | ............... | H04N 21/23418 |

* cited by examiner

*Primary Examiner* — Eric J. Bycer
(74) *Attorney, Agent, or Firm* — Mehrman Law Office; Michael J. Mehrman

(57) ABSTRACT

Video features encourage and ensure that survey videos are viewed in full. The survey answer block and video rewind, forward fast and mute are disabled during the video presentation. With the user's permission, telephone calls, text messaging and browsing may also be disabled during the video. Interactive responses may be required at various points in the video to ensure that the viewer is paying attention. The viewer's image may be recorded or eye gaze may be tracked while viewing the video. Candidates may be qualified for viewing videos and selected in a priority order by meeting certain demographic conditions, having certain topics of interest identified in their social media profiles, agreeing to post-video direct contact, and having participated in prior video surveys. Potential candidates may be qualified by answering qualifying questions, viewing a teaser video, or responding to a prompt asking them to opt-in to the video survey.

20 Claims, 6 Drawing Sheets

ONLINE SITUATIONAL AWARENESS AND VIDEO SURVEY SYSTEM

TECHNICAL FIELD

The present invention relates to online situational awareness and survey systems and, more particularly, to an online situational awareness and video survey system.

BACKGROUND OF THE INVENTION

Many people today carry sophisticated mobile communications devices, such as smartphones and tablets, almost all the time. These devices provide a wide range of functions in additional to traditional telephone calls including location tracking, social media, video player, email, text, and so forth. Although video social media applications are available, there is very little ability to incorporate video into more sophisticated functionality.

Situational awareness and instant response systems have been developed that allow a user of a mobile communications device to obtain real-time information about the users of other mobile communications devices in selected areas of interest and engage them in online surveys. For example, a user may obtain real-time demographic data about users of other mobile communications devices within 100 feet, or in a specified geographic area, and then send online surveys to a specified target audience. While this is a powerful capability, it is generally limited to text or email surveys. There is very limited ability to incorporate video into the situational awareness or online survey features. This type of data would be valuable for a host of purposes, such as highly interactive electronic surveys, customer education programs, focus group marketing, and so forth. There is, therefore, a continuing need for situational awareness and online survey systems leveraging the power of video features.

SUMMARY OF THE INVENTION

The present disclosure meets the needs described above in an online situational awareness and video survey system with a variety of features to encourage and ensure that survey videos are viewed in full. For example, the survey answer block and video rewind, forward fast and mute may be disabled during the video presentation. With the user's permission, telephone calls, text messaging and browsing may also be disabled during the video. Interactive responses may be required at various points in the video to ensure that the viewer is paying attention. The viewer's image may be recorded or eye gaze may be tracked while viewing the video. Candidates may be qualified for viewing videos and selected in a priority order by meeting certain demographic conditions, having certain topics of interest identified in their social media profiles, agreeing to post-video direct contact, and having participated in prior video surveys. Potential candidates may be qualified by answering qualifying questions, viewing a teaser video, or responding to a prompt asking them to opt-in to the video survey.

In view of the foregoing, it will be appreciated that the present disclosure provides an improved situational awareness and video survey system. The specific systems and techniques for accomplishing the advantages described above will become apparent from the following detailed description of the embodiments and the appended drawings and claims.

DETAILED DESCRIPTION OF ILLUSTRATIVE EMBODIMENTS

Figure 1:
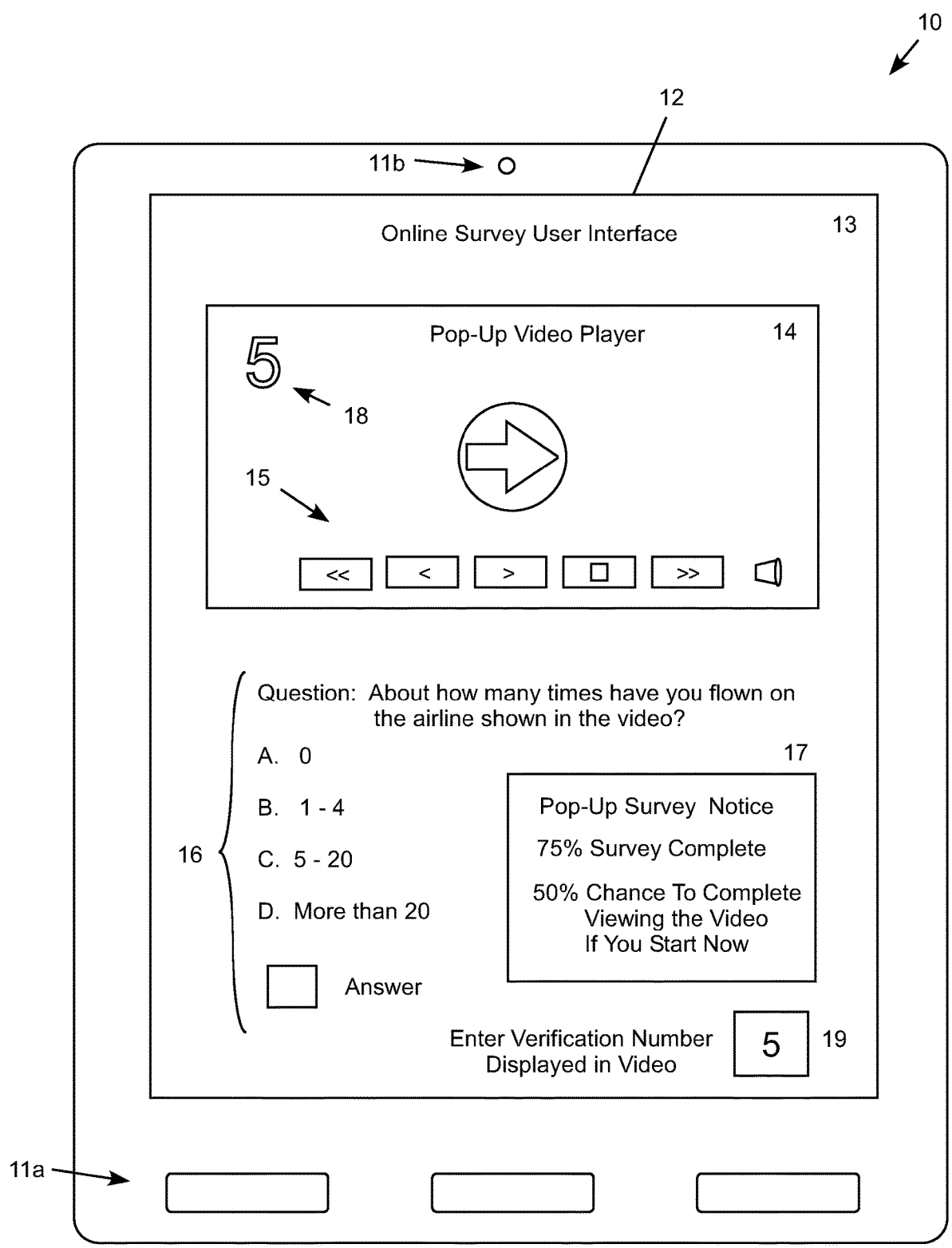
FIG. 1 is a conceptual illustration of a representative graphical user interface for the situational awareness and video survey system.

The present invention may be embodied in an online situational awareness and video survey system that uses a network-based instant response controller to communicate with mobile communication devices, such as smartphones. The mobile communication devices are associated with user profiles, such as social media profiles, containing demographic data and topics of interest for associated users. A video survey requester (also referred to as a customer) obtains situational awareness data that typically includes demographic or topic or interest statistics for mobile communication devices located in a geographical area of interest specified by the requester. The requester may also specify a target demographic objective and a video survey that is presented to participating mobile communication devices through a dynamic polling algorithm that iteratively adjusts the target audience to automatically "hone in" on a survey result that meets the target demographic objective. The video survey requester may be charged (e.g., $2 per response), and the users of the participating mobile communication devices may be compensated (e.g., $1 per response) on a per-response basis. As another option, the participant response fees may be donated to charity. The video survey features can be utilized in concert with the situational awareness and instant response systems described in U.S. Pat. Nos. 9,894,077 and 9,965,556, which are incorporated by reference Because the requester is typically compensated per-response for mobile device users to view their video as part of a survey response, the direct response controller implements a number of features to encourage and ensure that the videos are viewed in full before compensation is paid. For example, the survey answer block and certain video player functions may be disabled during the video presentation, such as rewind, forward fast and mute. With the user's permission, other features of the mobile communication device, such as telephone calls, text messaging and browsing may also be disabled during the video presentation. Interactive responses may be required at various points in the video to ensure that the viewer is paying attention. With the viewer's permission, in some cases for additional compensation, the viewer's image may be recorded or eye gaze may be tracked while viewing the video. Video viewing candidates may be qualified for viewing certain videos and selected in a priority order, for example by meeting certain demographic conditions, having certain topics of interest identified in their social media profiles, agreeing to post-video direct contact, and having participated in prior video surveys. Potential candidates may also be qualified by answering qualifying questions, viewing a teaser video, or responding to a prompt asking them to opt-in to the video survey. Qualifying candidates may be offered additional compensation to view the video, provide feedback, have their image recorded while viewing the video, write a review, or participate in post-survey direct communications.

FIG. 1 is a conceptual illustration of a representative graphical user interface for the situational awareness and video survey system. A mobile communication device 10 operated by a user (e.g., a member of the instant response system) includes control items 11a, camera 11b, and a display screen 12 showing a graphical user interface 13 for the situational awareness and video survey system. A pop-up video player 14 with video control items 15 is displayed as part of an online survey question 16. A pop-up message screen 17 may display prompts or other messages, such as a message designed to encourage a potential viewer to participate in the survey by starting the video. A variety of devices may be used to ensure that the viewer is paying attention to the video. For example, a character 18 may be displayed on the video, which the viewer must enter onto a verification box 19 to progress the video.

The situational awareness and video survey system leverages video questions to assist survey requesters (e.g., customers) in acquiring real-time polling research data. For instance, in some scenarios the video player 14 may pop up on the display screen 12 of the mobile communication device 10 (e.g., smartphones) of a survey participant (e.g., a member of the instant response system). For example, an informational or promotional video about a particular airline may play in connection with a survey question 16 asking the member about how many times they have flown that specific airline. The survey requester may be a customer paying a per-response fee to obtain the video impression and survey response and from the member. A variety of devices may be used to ensure that the member actually views the entire video prior to answering the survey question. For example, certain constraints can be placed within the mobile video survey application (e.g., the member's smartphone 10 running the 1Q app). For example, the member's smartphone 10 may be prevented from answering the survey question 16 associated with the video until the video has completed. In addition, certain video control items 15, such as fast-forward, rewind and mute, may be disabled until the video has been completed. If the member exits the video survey application, then the video will automatically pause, and then resume where it left off when the member reenters the application. This system may also force audio on to a preset minimum volume while in the video survey application to ensure that the member will have the opportunity to listen to as wells as watch the video to provide a proper response to the poll.

In some cases, the member will not be able to answer the survey question 16 after a target number of survey answers have been received. Once the system has received the target number of answers, the video therefore expires automatically so as not to continue utilizing the member's time once their response is not needed. As another feature, once a certain percentage or number of the video responses have been received, a ping may be sent to the customer (i.e., the requester of the video survey) noting that X amount of people are currently watching the video out of Y amount of people that need to be polled according to the survey parameters set by the customer. Based on real-time statistics connoting member video watching, a question can be posed to the customer to inquire if the customer would like to request additional survey information or obtain additional responses, for example at a discounted rate.

Additionally, video status information regarding other members usage can also be sent to members as well. For example, the pop-up message window 17 may display a ping informing members that X amount of members are currently watching the video out of Y amount of members that need to be polled as per the customer's request. This information may also include, for example, how many (or what percentage of) members are at a specific point of the video (e.g., 25% complete, 50% complete, 75% complete, etc.), how many (or what percentage of) members have paused the video, how many (or what percentage of) members have exited the application before completely watching the video, etc. The real-time video data can also be used to provide the members with a likelihood for video completion. For example, "if you begin viewing the video right now, you are 75% likely to complete the video and questionnaire in time to be included in this poll," or "currently this poll is at capacity, however, if at least 2 members pause their video, then your response will be included in this poll."

In another feature, the member may authorize (possibly for a higher payout) to have their image recorded by the camera 11b in their mobile device 10 while watching the video. This could allow the customer to solicit viewer feedback during the video or watch the viewer's expressions to ascertain the viewer's reaction to the video as yet another polling-type data point. This can also be performed by a facial recognition feature capable of determining sentiment analysis. As another feature, eye gaze tracking software could be used to determine if the member has actually watched (or kept his/her eyes on) the video for a majority of the time the video took place. The eye gaze tracking software could also be used to determine if the member has looked at all of the answers prior to answering the survey question. It should be noted that in some cases, the entire question could be in the form of audio-video, audio alone, or video alone.

In another feature, a verification type system ensures that the member is actually watching and listening to the video. For instance, during an audio verification, the mobile device can display or announce a verification character 18 (such as the number "5" shown in FIG. 1) and the member will have to input the verification number 18 into the verification box 19 to advance the video further. This will verify that the member is actually watching or listening to the video. As another example, the verification character (the number "5" in this example) could flash in random areas of the video display screen 14 or the larger area of the graphical user interface 13 of the mobile device 10. When the member sees the number, they will have to input the number (or verbally speak the number into the microphone) into the mobile device to proceed with the video. For example, the member may be allowed to miss only a specific number of visual or audio queues before the member is precluded from completing the video or answering the survey question. This data can also be included in what is sent to customers and other members regarding their likelihood for being able to complete the video. For instance, it could say "20% of the current members taking this poll will be dropped from the poll if they miss 1 more queue".

A video survey may include a periodic verification where the app checks to see if the member is still engaged. For instance, a number can periodically flash in a particular area of the screen and the member will have to input the number each time for the video to continue. As another option, random questions can be added intermittently throughout the video. In some instances, the questions can specifically be about the video itself. For example, a question could be, "what was the best (worst, most effective, etc.) part of the video?" As a part of the answer, the member may be prompted to slide a slider to the section of the video that they felt was the best part of the video.

In some cases, the video can be deleted after a single watch in a SNAPCHAT® like format. With the member's permission, other control items 11a and touch-screen control may be disabled during the video so that other operations are unavailable and/or the member cannot exit the video until the video has run to completion. In this situation, the member would be advised of the exact length of the video so that the member will know how long their mobile device will be unavailable for other operations. Additionally, members may be able to select a setting allowing their mobile device to be taken over via the video survey application as the default condition. Members that select to have their device taken over may be provided with preferential treatment, such as dynamic survey priority, answer submission priority, preventing survey time-out once the video has started, increased payouts, additional follow-on questions, etc. The rationale behind the preferential treatment stems from the fact that the member allowing the video survey application to take over the member's mobile device increases the likelihood of the member focusing on and completing the video and survey questionnaire, which reduces member distractions, reduces member drop-off once they start the videos, and increases the quality of the member responses. Of course, emergency functions like dialing 911 will still be available and the member will have the ability to override the take over for other situations. If the member overrides the takeover, then they may receive a demerit, a reduced priority, or may only be granted so many manual overrides within a certain time period.

In some cases, the members might be able to answer questions verbally, where voice recognition and intonation can be used to determine how the member is feeling while the video is playing. Biometric data (e.g., fingerprint, facial recognition, voice recognitions, etc.) may also be used to launch the video, determine if the question is being answered by the intended member, whether the member is paying attention to the video, and whether the video survey app remains active. The system can also use speed or GPS analysis to prevent the video form being played while the viewer is walking or driving. For example, if the application determines that the mobile device is being used to play a video survey while a vehicle is in motion, the mobile device can prompt the member for an affirmation that the member is a passenger of the vehicle (and not the driver) in order for the video survey to proceed. Similarly, the mobile device's rear and/or front facing camera can be used to confirm that the member is actually a passenger in the vehicle and not the driver.

In instances where the displayed text or video might be small, the member may have to enlarge certain sections of the screen to actually read or see relevant portions. Very large or tiny print may also be used as a verification technique. For example, the member may be prompted to enlarge or decrease the size of the screen, and then enter a verification character only visible at the new display size, as a verification method. Enlarging or decreasing the display itself in response to the prompt may also be used as a verification technique. Any of these techniques can be used individually or in combination with other mechanisms for encouraging or ensuring that the member is paying attention to and, if desired, continuously engaging with the survey video.

Figure 2:
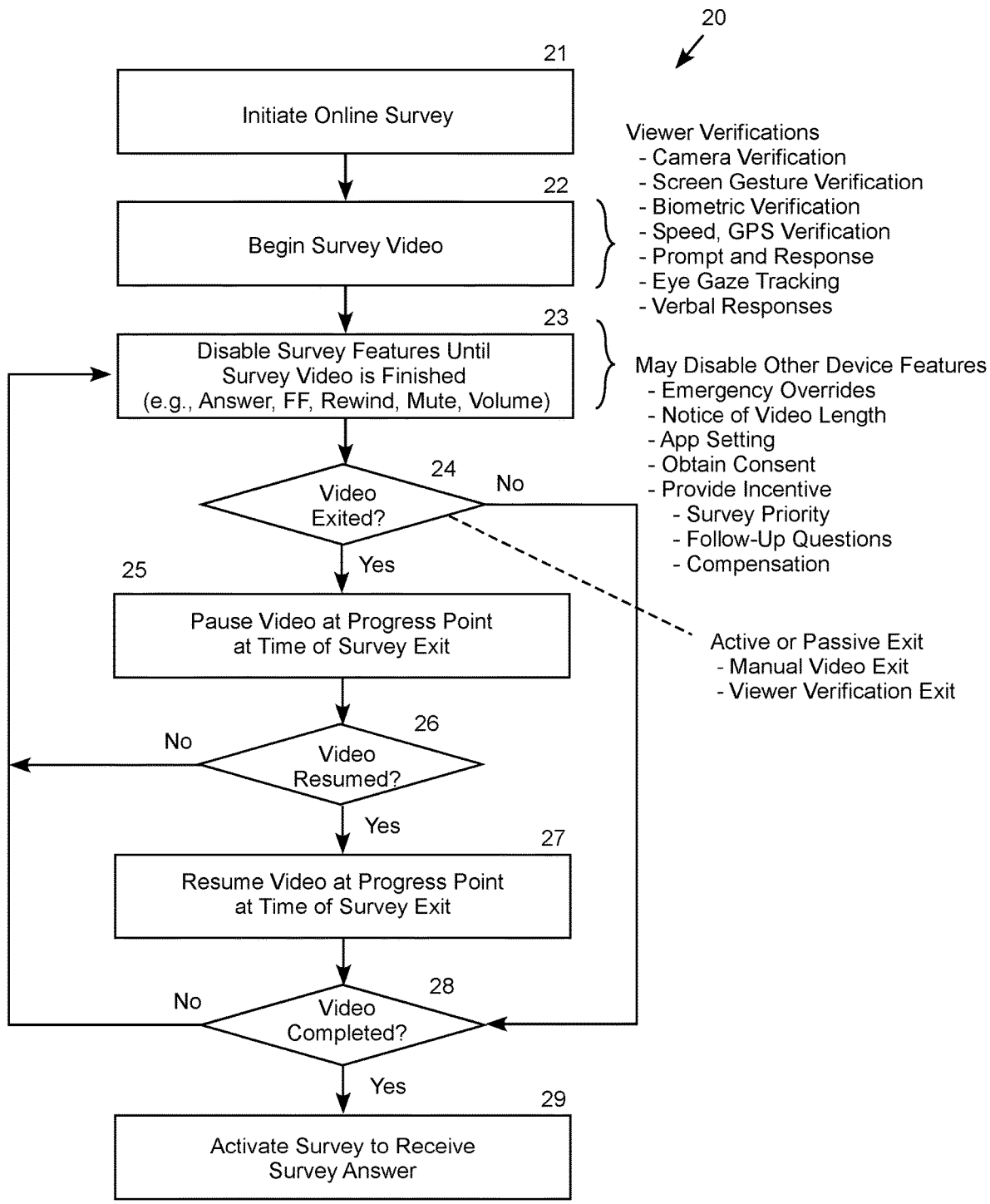
FIG. 2 is a logic flow diagram for disabling video features during a survey video.

FIG. 2 is a logic flow diagram 20 in which an online situational awareness and video survey system disables video features during a survey video. For example, this procedure may be performed by an online instant response server in the online situational awareness and video survey system. In step 21, the system initiates an online survey, typically by sending a survey question created by a survey requester (also referred to as a customer of the online situational awareness and video survey system) to a number of survey recipients (also referred to as members of the online situational awareness and video survey system). The customer creates the online survey using a menu-driven set of graphical user interfaces that decides the question as well as parameters for conducting the survey, such as the number of desired responses (for which the customer typically pays a per-response fee) and a time-out parameter. The members typically participate in the survey by agreeing to receive online survey questions (for which each member that provides an accepted response is typically paid a per-response fee), enabling location tracking of their mobile devices, and allowing their locations to be used in the survey.

The online survey may also define a geographic area of interest, a subject matter area of interest, and a target demographic objective for the survey. The system typically implements a dynamic polling algorithm that automatically adjusts the number and demographic distribution of the member systems participating in the survey by determining a residual demographic objective based on the target demographic objective, the location tracking data, and partial survey results, adjusts the priority order of the target audience of member systems to meet the residual demographic objective through subsequent survey requests, and directs the survey request to a residual portion of the target audience of member systems in the adjusted priority order. See, for more detail, U.S. App. 20170323209 and U.S. App. 20170357722 (U.S. Pat. No. 9,965,556), which are incorporated by reference.

Step 21 is followed by step 22, in which a survey begins as part of the survey question. In general, the customer (who is typically paying for the survey) wants to ensure that the member watches and pays attention to the video before answering the survey question (and typically receive payment for answering the survey question). The member may be asked to turn on the video player, or the system may remotely force on the video player viewer (i.e., the survey participant or member) watches and pays attention to the video before answering the survey question. The member may also be asked to turn on, or the system may remotely force on (typically with the viewer's consent), a range of viewer verification techniques used to ensure that the viewer watches and pays attention to the video before answering the survey question.

Viewer verification techniques include using the camera on the viewer's mobile device playing the video to watch or record the viewer as the viewer watches the video camera verification ("camera verification"). The video may also prompt the viewer to make specific gestures, such as waving or swiping the screen on the viewer's mobile device ("screen gesture verification"). In situations where the identity of the viewer is very important, such as video disclosures involving security clearances, the video may prompt the viewer to provide a biometric signature to validate the viewer's identity, such as a password, handwritten signature, facial recognition, speech recognition, fingerprint, retina scan ("biometric verification"). In situations where the viewer is traveling as detected by the GPS monitoring and speed detection of the viewer's mobile device, the viewer may be required to stop traveling or verify that they are not driving prior to viewing the video, for example by providing a verification statement or camera shots of the viewer and the driver ("speed, GPS verification").

Viewer verification may also be used during the course of the video to ensure that the viewer is actually watching and paying attention to the video. For example, the video may play various types of prompts requiring viewer response, such as a spoken or displayed prompt requiring the viewer to provide some type of response ("prompt and response"). The character 19 displayed as part of the video and verification box 19 shown in FIG. 1 illustrates this type of prompt and response feature. Eye gaze tracking using the camera on the viewer's mobile device is another illustrative technique for providing viewer verification during the course of the video. Periodically asking the viewer to provide verbal responses to prompts displayed or announced by the video is another example.

Step 22 is followed by step 23, in which the system may disable certain video and survey features while the video is playing. For example, the survey answer feature and video functions including forward fast, rewind and mute may be disabled, and a minimum volume level may be required, until the video has finished playing. Other features, such as telephone calls, text messages, and internet browsing may also be disabled during the video. These disable features are subject to emergency overrides, such as 911 calls, emergency notices, and an easy "opt out" feature, such as entering a predefined key sequence, holding a particular button down for a specified duration, or speaking a predefined opt-out command. The viewer may also receive a notification and be required to authorize the disable feature, and be provided with an associated incentive, such as increased survey priority, inclusion in follow-up questions, and increased compensation.

Step 23 is followed by step 24, in which the system determines whether the viewer has exited the video or the associated survey before completion. For example, this may be an active exit where the viewer manually exits the video, or a passive exit where the system exits the video in response to the viewer failing a viewer verification. If the video has been exited, the "yes" branch is followed from step 24 to step 25, in which the system pauses the video at the progress point at the time of the exit, which may allow the viewer to continue the video from that point at a later time. Step 25 is followed by step 26, in which the system determines whether the viewer has resumed the video. If the viewer has resumed the video, the "yes" branch is followed from step 26 to step 27, in which the video resumes from the progress point at the previous time of exit. Step 27 is followed by step 28, in which the system determines whether the complete video has played. If the complete video has played the "yes" branch is followed from step 28 to step 29, in which the system activates the survey to receive one or more answers from the viewer. In other words, the viewer is allowed to answer the survey question only after the complete video has played.

Referring again to step 24, if the video has not been exited, the "no" branch is followed from step 24 to step 28, in which the system determines whether the complete video has been played. Referring again to step 26, if the video has not resumed, the "no" branch is followed from step 26 to step 23, in which the system disables certain survey and video features until the complete video has played. Referring again to step 28, if the video has not completed, the "no" branch is followed from step 28 to step 23, in which the system disables certain survey and video features until the complete video has played. As noted previously, the viewer may access emergency services and "opt out" of the disable conditions with predefined commands. Alternatively, the disable features may be automatically deactivated when the viewer exits the video, which may be configured (including a default setting) by survey participants on a case-by-case basis through a user command or configuration setting.

Figure 3:
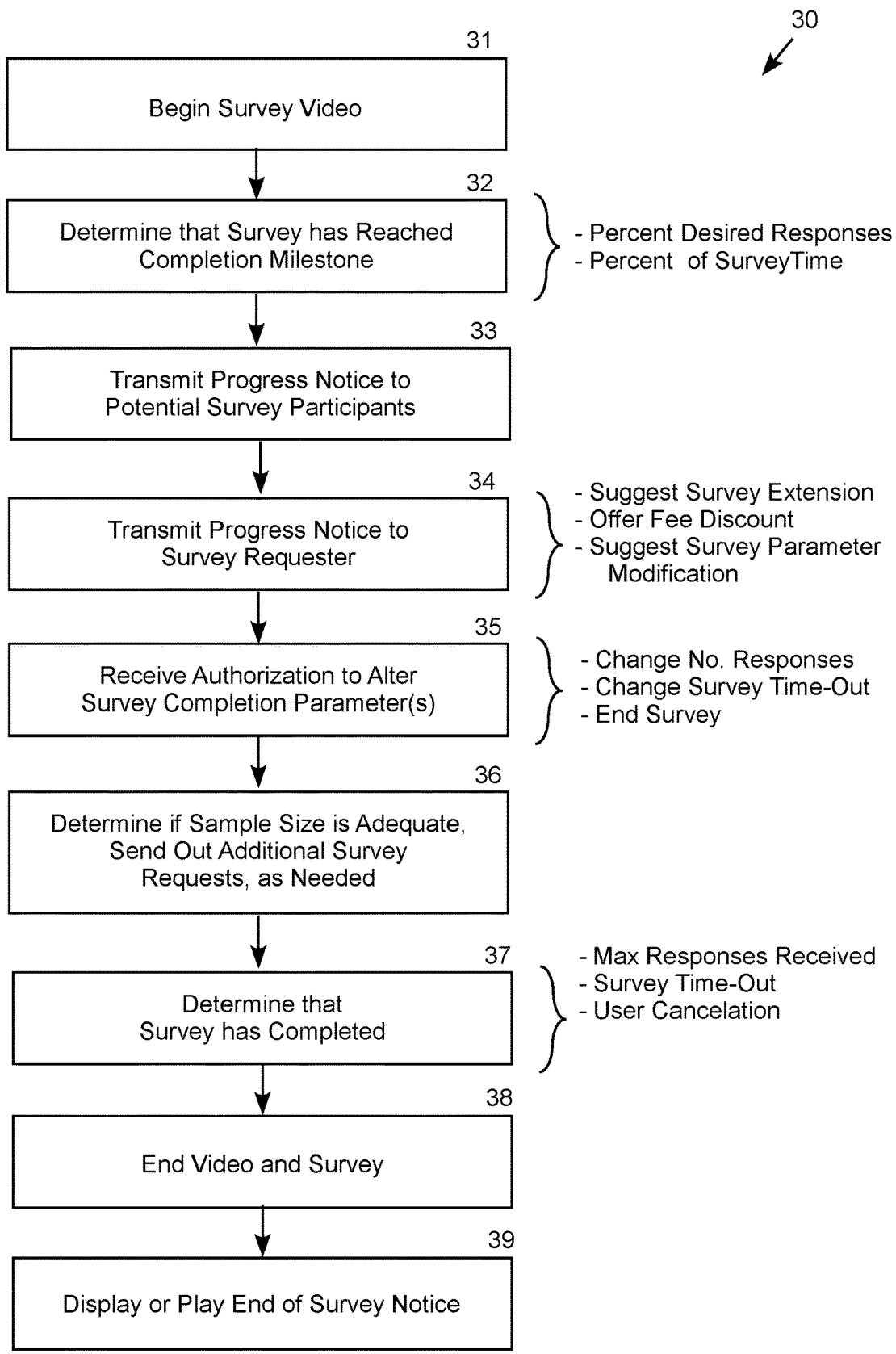
FIG. 3 is a logic flow diagram for extending survey participants during the survey video.

FIG. 3 is a logic flow diagram 30 for extending a survey time or increasing the number of survey participants during a survey video in the situational awareness and video survey system. In step 31, the survey video begins, typically in response to the survey participant (member or viewer) responding to a text inviting the member to participate in the survey. The video survey typically proceeds through an iterative, dynamic polling procedure that causes the survey to "hone in" on a target demographic objective specified by the survey requester. The survey requester may also specify survey parameters including a desired number of survey responses (that the requester typically agrees to pay for on a per-response basis) and a survey time-out parameter. The system has the ability to provide the survey requester with information about the success, such as the number of responses received, remaining time until survey time-out, number of videos in progress, number of paused or exited videos, and so forth. The system also allows the survey requester to alter the survey parameters while the survey is in-progress, such as changing the number of desired responses and extending the survey time in response to instructions received from the survey requester while the survey is in-progress.

For example, in step 32 the system determines that the survey has reached a completion milestone, such as a percentage of the desired number of responses or a percentage of the survey time until the time-out is reached. In this example, the desired number of responses and the survey time-out are survey parameters specified by the survey requester at the time the survey is defined. The completion milestones may also be parameters specified by the survey requester at the time the survey is defined. Alternatively or additionally, the system may supply the milestones or set default values for these parameters. Step 32 is followed by step 33, in which the systems sends progress notifications to potential survey participants. For example, the system may send a text to qualified potential survey participants, who are not already participating in the survey, saying "50% of the survey is now complete. You still have an 80% chance of answering the survey if you begin the video now." As another example, the system may send a text to qualified potential survey participants saying "50% of the survey is now complete. Start the video now to receive a double payment premium if your answer is accepted before the survey ends."

Step 33 is followed by step 34, in which the systems sends progress notifications to the survey requester. For example, the system may send a progress notification along with a survey parameter adjustment suggestion, such as a suggestion to increase the survey time-out parameter in order to receive the specified number of survey responses As another example, the system may send a progress notification along with a promotional offer, such as proposed fee discount for additional survey responses resulting from an increase in the number of survey participants entered while the survey is in process. Step 34 is followed by step 35, in which the system receives an authorization from the survey requester to alter a survey parameter, such as extending the survey time-out or increasing the number of desired survey responses. Step 35 is followed by step 36, in which the system determines whether the number of survey requests that have already been send out (current sample size) is probably adequate to achieve the desired number of survey responses within the remaining survey time. If not, the system sends out additional survey requests, which are typically directed to a residual target audience having a residual demographic objected selected to cause the overall survey to "hone in" on the target demographic objective for the overall survey.

Step 36 is followed by step 37, in which the system determines that the survey has reached completion, for example because the survey has produced the desired number of survey responses, or by timing out (reaching the survey time-out parameter). It should be noted here that the survey may designed to receive a desired number of responses regardless of the demographic makeup of the survey participants, or the survey may designed to receive a desired number of responses meeting a specified target demographic objective. Similarly, the survey may also or alternatively be designed to receive a desired number of responses regardless of the geographic locations of the survey participants, or the survey may designed to receive a desired number of responses from survey participants within a specified geographic area. Along the same lines, the survey may also or alternatively be designed to receive a desired number of responses regardless of any subject matter of interest specified in the profile data of the survey participants, or the survey may designed to receive a desired number of responses from survey participants who have expressed a particular subject matter of interest. Step 37 is followed by step 38, in which the system ends the video survey, which may include ending any survey videos in progress by members who are watching the video when the survey ends. This avoids wasting member's time watching the remaining portion of a video when the survey has already ended. Step 37 is followed by step 38, in which the system sends out an end of survey notice, which typically goes to the survey requester, the survey respondents, all of in-progress survey participants who did not get to finish watching the video and answering the survey question before the end of the survey, and all of the partial survey participants who paused or exited the video before it reached completion.

Figure 4:
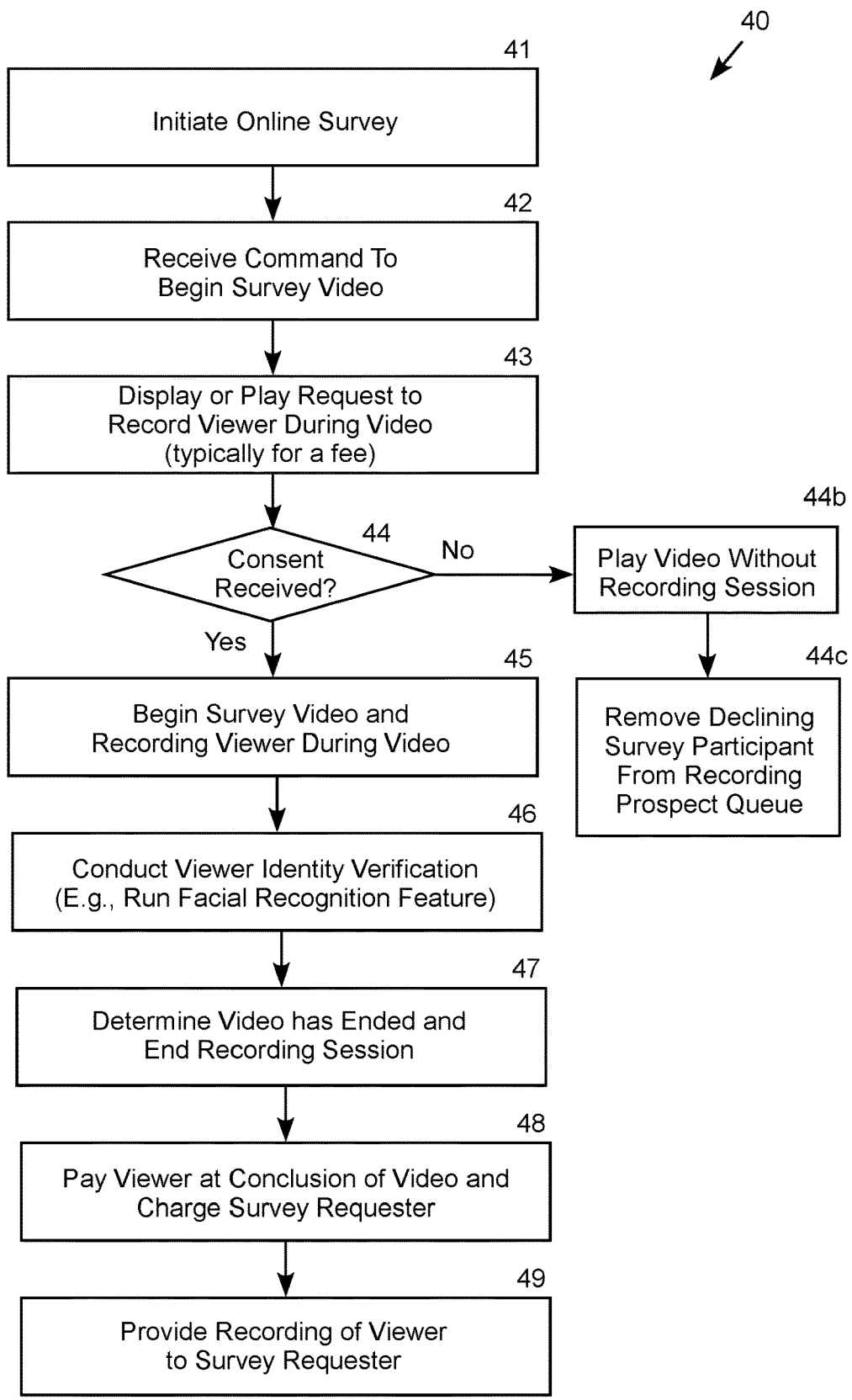
FIG. 4 is a logic flow diagram for recording a survey participant during the survey video.

FIG. 4 is a logic flow diagram 40 for recording a survey participant during a survey video. In step 41, the viewer initiates the online survey by indicates that they intend to participate. Step 41 is followed by step 42, in which the system receives a command to begin the video. Step 42 is followed by step 43, in which the system plays or displays a request to record the viewer while they watch the video using the camera on the viewer's mobile device that will be used to play the video. Step 43 is followed by step 44, in which the system determines whether consent to record the viewer has been received. If the viewer does not consent, the "no" branch is followed to step 44b, in which the system causes the viewer's mobile device to play the video without recording the viewer while they watch the video. The system typically maintains a queue of recording prospects with the objective of obtaining a number of recorded viewers specified by the survey requester as a survey parameter. Step 44b is therefore followed by step 44c, in which the system removes the survey participant that declined to be recorded from the queue of recording prospects. Depending on the number of recordings authorized, the number of prospects remaining in the queue, and the number of recordings ordered by the survey requester, the system may offer a promotion to the survey participant in an effort to secure their consent to recording. For example, the system may offer the survey participant increased survey priority, increased response fee, the ability to participate in follow-up questions to earn additional compensation, the ability to participate in post-survey review to earn additional compensation, and so forth.

If the viewer does consent, the "yes" branch is followed from step 44 to step 45, in which the system plays the video while recording the viewer. If viewer identity verification is required, step 45 is followed by step 46, in which the system conducts viewer identify verification, such as facial recognition, voice recognition, password, written signature, fingerprint, retina scan, or other type of identity verification. Step 46 is followed by step 47, in which the system determines that the video has ended and therefore ends the recording session. Step 47 is usually, but not necessarily, followed by step 48, in which the system pays the survey participant and charges the survey requester their respective fees. Step 48 is usually, but not necessarily, followed by step 49, in which the system provides the recording to the survey requester. As an option, the recording may only be used to verify that the viewer actually watched the video and/or may provide the requester with data supplied by the viewer without actually providing the recording of the viewer to the requester.

Figure 5:
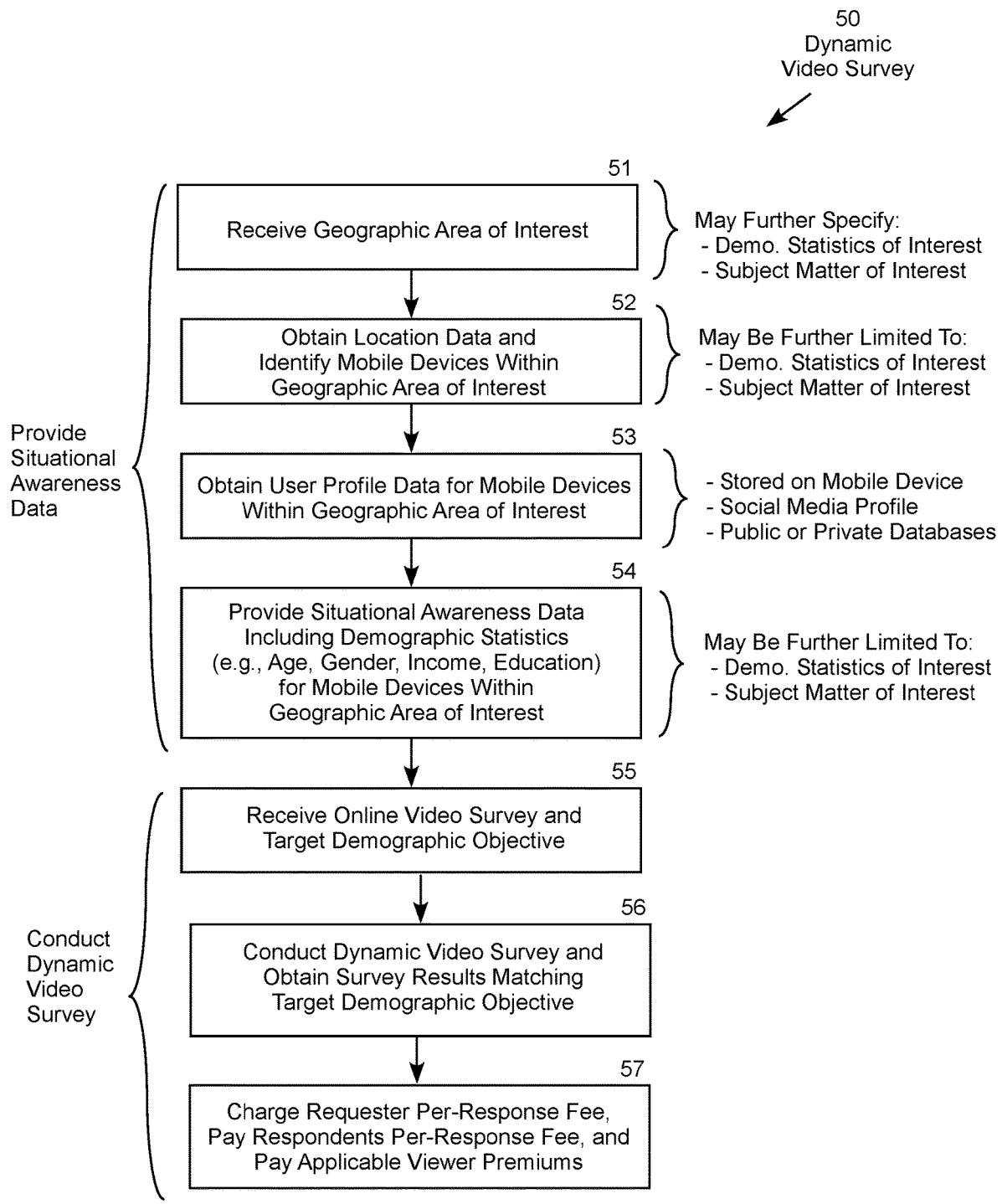
FIG. 5 is a logic flow diagram for conducting a dynamic survey video.

FIG. 5 is a logic flow diagram 50 for conducting a dynamic survey video in the situational awareness and video survey system. In this process, a prospective survey requester (customer) first engages in situational awareness (steps 51-54) to determine whether to conduct a survey and to make informed decisions about survey questions to ask and survey parameters. The situational awareness aspect of the process is described in U.S. App. 20170323209 and U.S. Pat. Nos. 9,894,077 and 9,965,556, which are incorporated by reference. Once they are satisfied with the situational awareness, the customer may proceed with a video survey request (steps 55-57), which may include the detailed procedures described previously as well as the dynamic polling techniques described in U.S. App. 20130226664 and U.S. App. 20140257931, which are also incorporated by reference.

To place this process in the context of an illustrative video survey, in step 51 the system receives a geographical area of interest from a prospective survey requester (customer). The customer may also or alternatively specify a target demographic objective and/or a subject matter of interest. If the situational awareness request specifies a geographic area, step 51 is followed by step 52, in which the system obtains location data for member mobile devices, which may be obtained from the member mobile devices directly, or from social media files that communicate with the member mobile devices. The system then identifies members mobile devices that are located in the geographic area of interest specified in the situational awareness request. If the situational awareness request specifies a target demographic profile or subject matter of interest, step 52 is followed by step 53 in which the system obtains member profile data for the members associated with the member mobile devices located in the geographic area of interest. This type of data may be obtained from the member profile data maintained on the mobile devices themselves (e.g., from the instant response system apps installed on the member mobile devices), from social media files that communicate with the member mobile devices, or from member profiles created by the members stored maintained by the system. Relevant member profile information may also be obtained from relevant public or private databases (e.g., traveler database, university enrolment database, customer loyalty database, public offender database, home or visitor location registration database, etc.). For example, member mobile devices within the geographic area of interest. Step 53 is followed by step 54, in which the system provides situational awareness information to the requester, such as demographic statistics (e.g., age, gender, income level, education, etc.) and subject matter of interest statistics, which may be qualified by the demographic statistics, for the members associated with the member mobile devices located in the geographic area of interest.

Step 54 is followed by step 55, in which the system receives a survey request, which typically includes a geographic area of interest, a target demographic objective and/or a subject matter area of interest, and survey parameters (e.g., number of desired survey responses and a survey time-out). For a video survey, the survey requester also supplies a video and may provide survey video parameters, such as a desired number of recorded viewing sessions and progress milestones. The survey requester may also supply a teaser video to be used to qualify prospective survey participants, as described further with reference to FIG. 6. Step 55 is followed by step 56, in which the system conducts the online video survey, which may be a dynamic survey designed to produce survey results that match a target demographic objective specified by the survey requester. The system then conducts an incremental dynamic survey in a priority order to automatically "hone in" on a survey result that matches the target demographic objective. Step 56 is followed by step 57, in which the system charges the survey requester a per-response fee and pays each survey participant that completes the survey a per-response fee. A variety of premiums may be paid to survey participants and charged to the survey requester as described previously. Typically, the system pays the survey participants one-half of the per-response fee that it charged to the survey requester, and retains the other half as the survey operator's fee.

Figure 6:
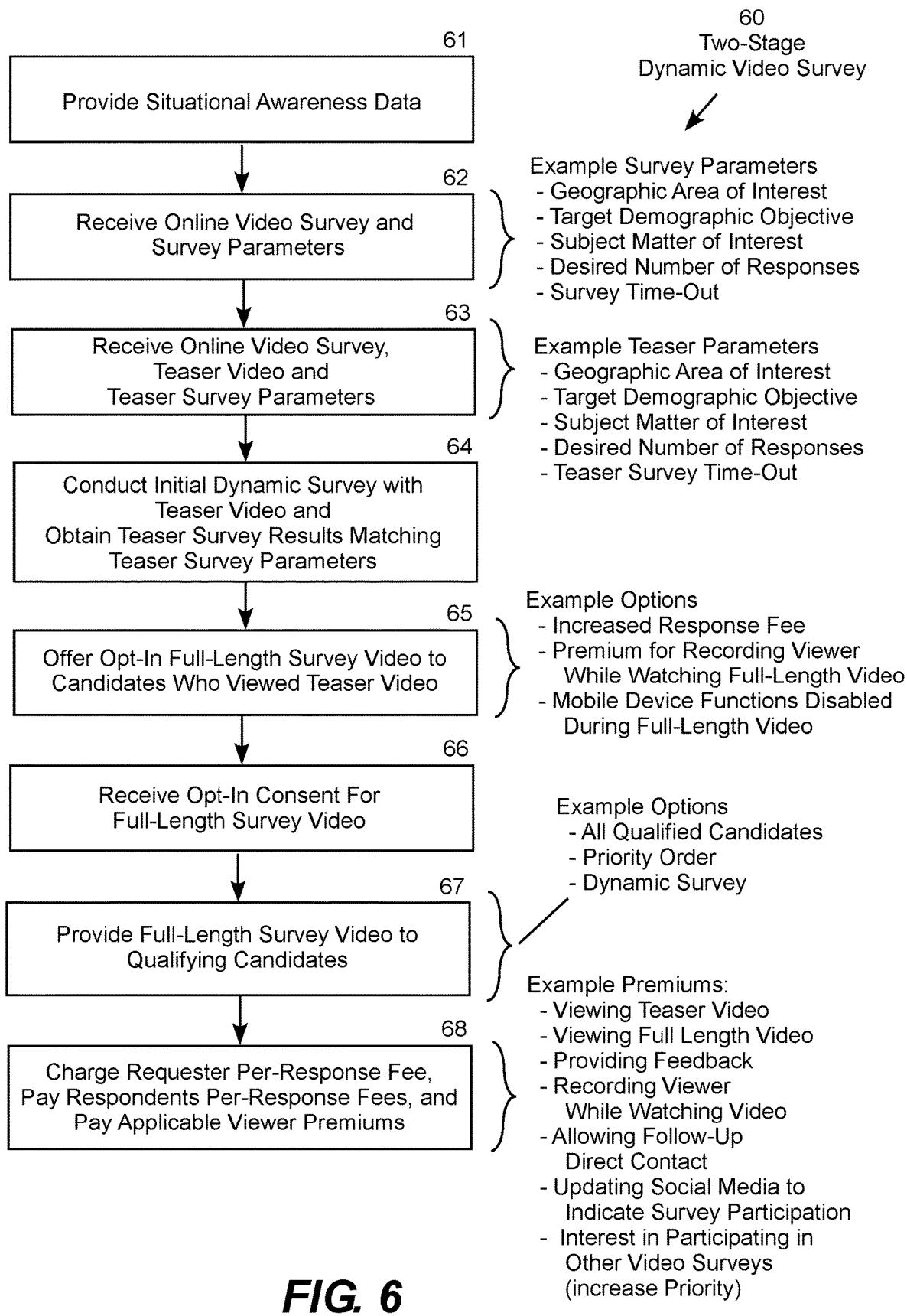
FIG. 6 is a logic flow diagram for using a teaser video in the situational awareness and video survey system.

FIG. 6 is a logic flow diagram 60 for using a teaser video in the situational awareness and video survey system. In step 61, the system provides situational awareness data to a prospective survey requester (customer). An illustrative example of this process is described in FIG. 5, steps 51-55. Step 61 is followed by step 62, in which the system receives an online video survey and survey parameters, such as a geographic area of interest, a target demographic objective, a subject matter of interest, a desired number of responses, and a survey time-out parameter. Step 62 is followed by step 63, in which the system receives a teaser video and teaser parameters, which may vary from the survey parameters as a matter of design choice. For example, the teaser may be shown to a larger sample size to qualify viewers for the longer survey video. The per-response fee charged to the survey requester may therefore be less for the teaser video then for the longer survey video. Viewers may not be compensated (or they may be compensated less) for watching the teaser video, while watching the teaser video may qualify them to participate in the survey video that provides a fee (or a larger fee).

Step 63 is followed by step 64, in which the system conducts an initial dynamic online survey using the teaser video and obtains teaser survey results matching the teaser survey parameters. Step 64 is followed by step 65, in which the system offers all or a portion of the teaser survey participant the ability to opt-in to the survey including the full-length video. The system may offer a response fee or an increased response fee for participating the full-length survey. Additional premiums may also be offered, such as video increased compensation, survey priority and so forth for additional authorizations, such as recording the viewing session, and additional participation by the viewer, such as providing feedback, writing a review, allowing post-video direct contact, and so forth.

Step 65 is followed by step 66, in which the system receives opt-in authorizations for the survey containing the full-length video from prospects who qualify by viewing the teaser video and answering an associated teaser survey. Step 66 is followed by step 67, in which the system provides the full-length survey to the qualified candidates, which may be submitted to all of the qualified candidates. Alternatively, the full-length survey may be submitted to the qualified candidates in a priority order until a desired number of responses have been received. The full-length survey may also be a dynamic survey conducted to obtain survey results meeting a target demographic objective. Step 67 is followed by step 68, in which the system may pay the survey participants and charge the survey requester on a per-response basis. Again, a variety of premiums may be provided to encourage survey participation. It should be noted that these procedures are not limited to video surveys, but may be applied equally to document or audible surveys using a teaser survey to qualify candidates to participate in a longer survey. Similarly, a teaser video survey may be used to qualify candidates to participate in a longer document survey, and a teaser document survey may be used to qualify candidates to participate in a longer video survey.

ALTERNATIVE EMBODIMENTS

The present disclosure may be implemented on portable computing devices, which may communicate with a server system providing access to a number of client systems over a network, or as a dedicated computing system. As such, embodiments of the disclosure may comprise adapting or reconfiguring presently existing equipment. Alternatively, original equipment may be provided embodying the disclosure.

All of the methods described in this disclosure may include storing results of one or more steps of the method embodiments in a non-transient storage medium. The results may include any of the results described in this disclosure and may be stored in any manner known in the art. The storage medium may include any storage medium described in this disclosure or any other suitable storage medium known in the art. After the results have been stored, the results can be accessed in the storage medium and used by any of the method or system embodiments described in this disclosure, formatted for display to a user, used by another software module, method, or system, etc. Furthermore, the results may be stored "permanently," "semi-permanently," temporarily, or for some period of time. For example, the storage medium may be random access memory (RAM), and the results may not necessarily persist indefinitely in the storage medium.

Those having skill in the art will appreciate that there are various vehicles by which processes and/or systems and/or other technologies described in this disclosure can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described in this disclosure may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Those skilled in the art will recognize that it is common within the art to describe devices and/or processes in the fashion set forth in this disclosure, and then use engineering practices to integrate such described devices and/or processes into data processing systems. That is, at least a portion of the devices and/or processes described can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems. All of the technology described in this disclosure is suitable for implementation using commercially available computing devices, such as network servers operated by the situational awareness system and smartphones or personal computers operated by members and customers. These computing devices may be interconnected via the Internet, mobile telephone voice and data system, or other data suitable network.

This disclosure sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components may be combined to achieve a particular functionality can be seen as "associated with" each other such that the desired functionality is achieved, irrespective of architectures or intermediate components. Likewise, any two components so associated can also be viewed as being "connected", or "coupled", to each other to achieve the desired functionality, and any two components capable of being so associated can also be viewed as being "functionally connected" to each other to achieve the desired functionality. Specific examples of functional connection include but are not limited to physical connections and/or physically interacting components and/or wirelessly communicating and/or wirelessly interacting components and/or logically interacting and/or logically interacting components.

While particular aspects of the present subject matter have been shown and described in detail, it will be apparent to those skilled in the art that, based upon the teachings of this disclosure, changes and modifications may be made without departing from the subject matter described in this disclosure and its broader aspects and, therefore, the appended claims are to encompass within their scope all such changes and modifications as are within the true spirit and scope of the subject matter described in this disclosure. Although particular embodiments of this disclosure have been illustrated, it is apparent that various modifications and embodiments of the disclosure may be made by those skilled in the art without departing from the scope and spirit of the disclosure. Accordingly, the scope of the disclosure should be limited only by the claims appended hereto.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. The disclosure is defined by the following claims, which should be construed to encompass one or more structures or function of one or more of the illustrative embodiments described above, equivalents and obvious variations.

The invention claimed is:

1. A method, comprising:
    receiving, by a mobile device comprising a processor, a video and a survey question pertaining to the video to be played via the mobile device to a selected participant in a video survey, wherein the survey question is disabled for answering when initially received by the mobile device;
    wherein the video and survey question have also been sent to a plurality of other potential participants of the video survey, wherein the video survey is configured to reach completion when a limited number of participants have finished the video and answered the survey question;
    displaying, by the mobile device, a survey message indicating a likelihood of the selected participant finishing the video before the video survey closes and answering survey question if the selected participant begins playing the video;
    playing, by the mobile device, the video in response to receiving a first user command to initiate playing of the video;
    activating, by the mobile device, the survey question for answering in response to finishing the playing of the video;
    receiving, by the mobile device, a second user command answering the survey question prior to completion of the video survey; and
    including the selected participant's answer to the survey question in results of the video survey.

2. The method of claim 1, further comprising disabling, by the mobile device, a fast forward video player function of the mobile device during the playing of the video.

3. The method of claim 1, further comprising:
    receiving, by the mobile device, request data representative of a request to enable a video camera of the mobile device during the playing of the video.

4. The method of claim 3, further comprising:
in response to receiving the request data, generating, by the mobile device, a prompt to activate the video camera of the mobile device during the playing of the video.

5. The method of claim 1, further comprising:
in response to a time associated with the playing the video being determined to have lapsed, displaying, by the mobile device, a verification prompt associated with the video to solicit a response to the video.

6. The method of claim 5, further comprising:
in response to failing to receive the response, pausing, by the mobile device, the video after an expiration of a timeout period or inactivity by a user.

7. The method of claim 5, further comprising:
in response to failing to receive the response, exiting, by the mobile device, the video after an expiration of a timeout period or inactivity by a user.

8. The method of claim 1, further comprising:
playing, by the mobile device, a survey progress message indicating a number of participants that are currently watching the video out of a total number of participants needed to reach the completion of the video survey.

9. The method of claim 1, further comprising:
playing, by the mobile device, a survey progress message indicating a number of participants that have paused the video or exited the video before finishing the playing of the video.

10. The method of claim 1, further comprising:
playing, by the mobile device, a survey progress message indicating a number of participants that will have to pause or exit their playing of the video in order for the selected participant to be able to answer the survey question before the video survey reaches the completion.

11. The method of claim 1, further comprising:
playing, by the mobile device, a survey progress message indicating a number of participants that will be dropped from the video survey if they fail to respond to a verification prompt.

12. The method of claim 1, further comprising:
disabling, by the mobile device, a telephone call, text, or a browsing function of the mobile device during the playing of the video.

13. The method of claim 1, further comprising:
disabling, by the mobile device, a mute or volume reduction video player function of the mobile device during the playing of the video.

14. A non-transitory computer storage medium storing computer-executable instructions for causing a computer-controlled apparatus to perform a method, comprising:
receiving a video and a survey question pertaining to the video to be played via the mobile device to a selected participant in a video survey, wherein the survey question is disabled for answering when initially received by the mobile device;
wherein the video and survey question have also been sent to a plurality of other potential participants of the video survey, the video survey is configured to reach completion when a limited number of participants have finished the video and answered the survey question;
displaying a survey message indicating a likelihood of the selected participant finishing the video before the video survey closes and answering the survey question if the selected participant begins playing the video;
playing the video in response to receiving a user command to initiate playing the video;
activating the survey question for answering in response to finishing the playing the video; and
receiving a user command answering the survey question prior to completion of the video survey; and
including the selected participant's answer to the survey question in results of the video survey.

15. The computer storage medium of claim 14, further comprising disabling a fast forward video player function of the mobile device during the playing of the video.

16. The computer storage medium of claim 14, further comprising:
receiving, by the mobile device, request data representative of a request to enable a video camera of the mobile device during the playing of the video.

17. The computer storage medium of claim 16, further comprising:
in response to the receiving the request data, generating, by the mobile device, a prompt to activate the video camera of the mobile device during the playing of the video.

18. The computer storage medium of claim 14, further comprising:
in response to a time associated with playing the video being determined to have lapsed, displaying, by the mobile device, a verification prompt in association with the video to solicit a response to the video.

19. The computer storage medium of claim 18, further comprising:
in response to failing to receive the response, pausing, by the mobile device, the video after an expiration of a timeout period or inactivity by a user.

20. The computer storage medium of claim 18, further comprising:
in response to failing to receive the response, exiting, by the mobile device, the video after an expiration of a timeout period or inactivity by a user.

* * * * *